UNITED STATES PATENT OFFICE.

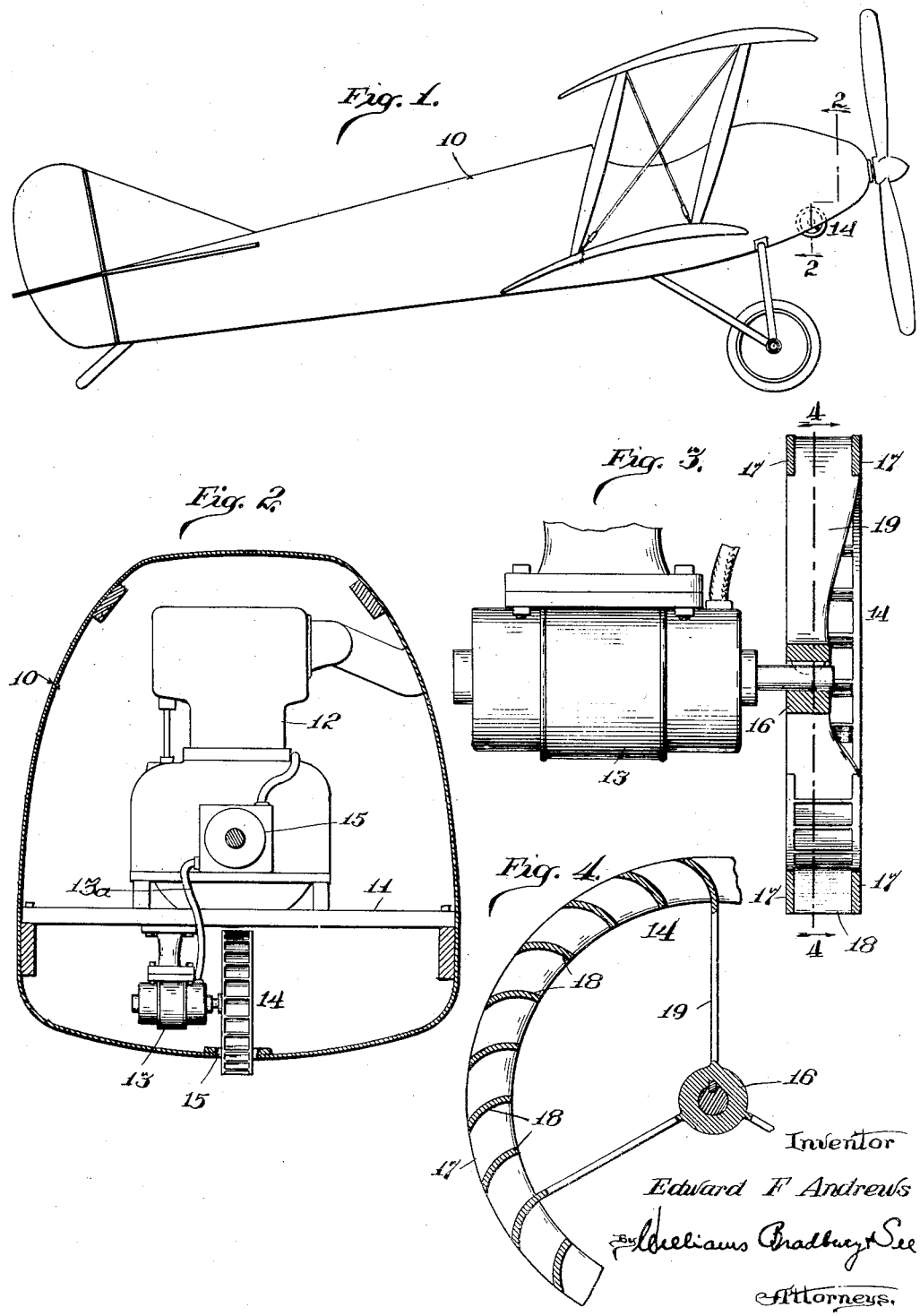

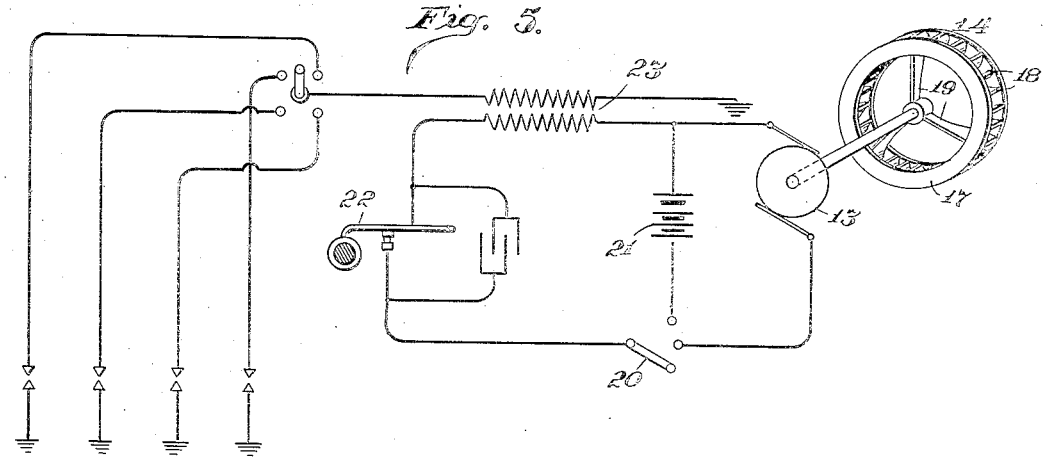
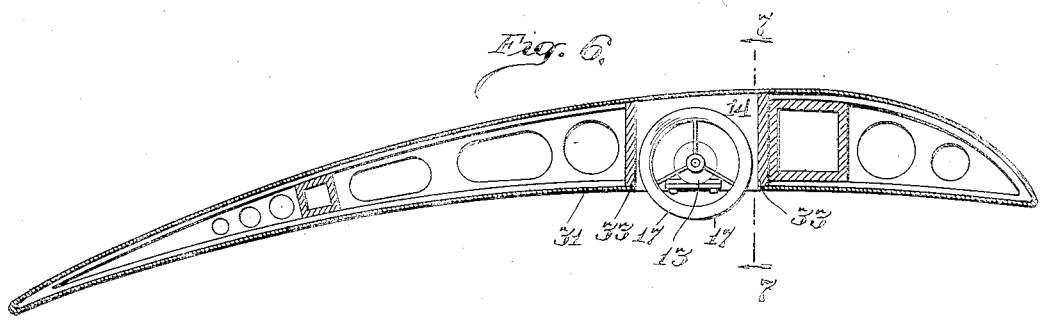
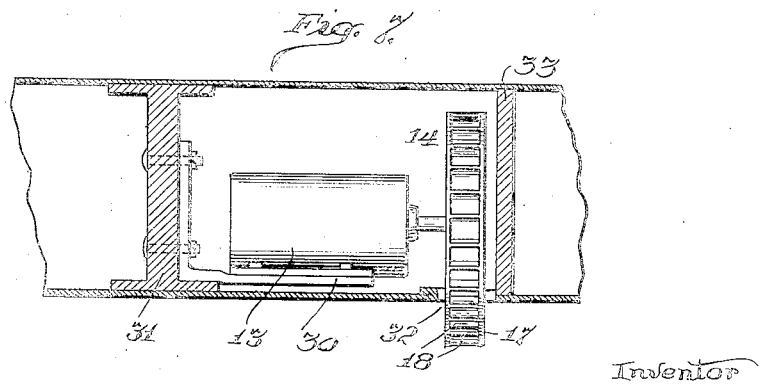

EDWARD F. ANDREWS, OF CHICAGO, ILLINOIS.

DRIVING MECHANISM FOR AIRCRAFT ACCESSORIES.

1,364,472.   Specification of Letters Patent.   Patented Jan. 4, 1921.

Application filed April 30, 1919. Serial No. 293,722.

*To all whom it may concern:*

Be it known that I, EDWARD F. ANDREWS, a citizen of the United States, residing at Chicago, in the county of Cook and State of Illinois, have invented a certain new and useful Improvement in Driving Mechanism for Aircraft Accessories, of which the following is a full, clear, concise, and exact description, reference being had to the accompanying drawings, forming a part of this specification.

My invention relates to driving mechanism for aircraft accessories, such for instance as generators, pumps and the like, and is concerned with a novel arrangement for supporting, protecting and driving such an aircraft accessory.

Such a small sized generator as is herein shown and described is of particular value when employed to furnish the ignition current for an airplane engine, and in the accompanying drawings I have illustrated my invention as employed to drive such an ignition generator, but it is to be understood that the generator may be used for electric lighting, to excite radio-signaling apparatus, or, in short, may be adapted to any purpose for which a generator of comparatively small capacity is suitable. Furthermore, the driving mechanism may be utilized to operate a variety of accessories other than generators.

More specifically, the objects of my inventions are:

First: To drive a generator or other aircraft accessory by means which is in no way geared or mechanically connected with the power plant of the ship with which it is employed, but is operated solely by the passing air when the ship is in flight;

Second: To provide a new combination and arrangement of parts whereby a generator, or other driven device, is entirely inclosed by the fuselage or other suitable part of the airplane structure by which it is carried, and is thus protected from the elements;

Third: To provide an arrangement of parts whereby a generator of the class mentioned adds practically nothing to the head resistance of the machine by which it is carried;

Fourth: To operate the generator, or other accessory, by means of a turbine or wind wheel, only the active portion of which is exposed to the passing air.

Other objects of my invention will appear as this description progresses.

I am aware of the fact that heretofore, particularly in military airplane practice, it has been customary to excite radio-signaling apparatus by means of a current generator driven by a miniature propeller. In such cases, however, the generator has been mounted on a wing panel, with its shaft parallel to the line of flight, the propeller being fixed upon the generator shaft. The generator and the propeller in such cases have been entirely exposed, with the result that the generator inevitably suffered more or less damage from exposure to the elements, and the generator and its propeller being entirely exposed, were objectionable in that they added greatly to the head resistance of the airplane. My invention makes it possible to inclose all of the generator and a large part of the turbine wheel within the fuselage or other stream-lined part of the airplane, so that the generator is effectually protected from the elements, and furthermore, so that practically no head resistance, except that converted into power, is incurred by the use of such a generator. In practice just enough of the turbine or wind wheel is exposed to the passing air to cause the generator to be properly operated.

The output of an electric generator is of course proportional to the speed at which its armature is driven. An ignition generator provided with the improvements of my invention is particularly advantageous because of the fact that the generator can be driven at high speed when the ship is in flight, thereby making it possible to use a smaller generator than would be possible if the generator were geared to the engine shaft in the usual manner. Of course elaborate gearing between the engine and the generator is objectionable.

In the accompanying drawings forming a part of this application—

Figure 1 illustrates an airplane, the fuselage of which is provided with the devices of my invention;

Fig. 2 is a sectional view taken on the line 2—2 of Fig. 1;

Fig. 3 is an isolated view of the generator and its associated turbine or wind wheel, the latter being shown in section, more clearly to reveal its construction;

Fig. 4 is a fragmentary sectional view of the turbine or wind wheel, taken on the line 4—4 of Fig. 3;

Fig. 5 is a diagrammatical representation of an airplane engine ignition circuit, deriving its ignition current from a generator driven in accordance with my invention;

Fig. 6 illustrates a generator and its associated turbine or wind wheel carried and inclosed by what may be considered a wing panel or other part of the aerofoil of the airplane; and Fig. 7 is a fragmentary sectional view taken on the line 7—7 of Fig. 6.

In Fig. 1 I have shown an airplane, the fuselage of which is illustrated at 10. The airplane shown is purely conventional, and may be of any suitable type. My invention is perhaps most conveniently applied to an airplane having a closed fuselage or nacelle. In the drawings the fuselage construction has been more or less diagrammatically illustrated, as the details of the same are unimportant. In Fig. 2 I have illustrated the engine bearers 11 carrying the engine 12. Entirely inclosed within the fuselage and in the present case carried by a bracket 12 secured to one of the engine bearers 11 is a comparatively small sized electric generator 13. I intend that the generator 13 in the present instance shall supply the ignition current for the airplane engine 12, but, inasmuch as the details of the ignition circuit are not important, I have illustrated a conductor conduit 13$^a$ extending from the generator 13 to a housing 15, which, it may be assumed, contains the transformer, primary circuit interrupter, condenser and distributing mechanism of the ignition circuit.

It will be noted that the generator 13 is preferably disposed so that the axis of its armature lies at substantially right angles to the line of flight, and that keyed or otherwise secured upon the armature shaft is a turbine or wind wheel 14, the major portion of which lies within the fuselage, a portion of the periphery of the said turbine or wind wheel, however, extending through an opening 15 in the bottom of the fuselage, so that the vanes of the turbine or wind wheel are exposed to the passing air when the airplane is in flight.

The turbine or wind wheel is preferably in the form of an integral casting comprising a hub 16, and peripheral rings 17, 17, between which are formed a plurality of vanes 18, 18. Webs 19, 19 connect rings 17, 17 with the hub 16. It will be noted that the outer end of each web is conformed to provide a vane similar in all respects to the vanes 18, 18.

When the generator is mounted as illustrated in Figs. 1 and 2, the vanes of the turbine or wind wheel are exposed to the main propeller slip stream, which is of advantage in that the turbine or wind wheel is not only driven by the passing air when the airplane is in flight but also when it is on the ground with the engine running. By virtue of the arrangement shown the armature of ignition generator 13 is driven at a very high rate of speed, which makes it possible to use a generator of smaller capacity than could be employed were the generator geared to the engine in the usual manner. It will be noted that the generator and a large part of the wind wheel are inclosed by the fuselage and protected from the elements, and, furthermore, that these parts add practically no head resistance to the airplane as a whole. Just enough of the turbine or wind wheel is exposed to drive the generator as required.

In Fig. 5 I have illustrated diagrammatically a suitable ignition circuit which may be employed in connection with an ignition generator driven in accordance with my invention. It will suffice to say that the primary circuit comprises a switch 20, whereby either the generator 13 or a suitable battery 21 may be connected in circuit with the interrupter 22 and the primary of the induction coil 23. This arrangement makes it possible to start the engine with battery ignition current, using the switch 20 to change to the generator after the ship is in flight, or after the engine is running at sufficient speed, if the turbine or wind wheel is exposed to the propeller slip stream, as illustrated in Fig. 1.

While it is convenient to mount the generator, or other accessory, and the turbine or wind wheel of my invention in a fuselage or nacelle, I contemplate mounting the same in any suitable part of the aircraft structure capable of receiving and inclosing the generator. For instance, in Figs. 6 and 7 I have illustrated what may be considered as a section of a wing panel or other part of the aero-foil of an airplane. In this case the generator is mounted on a bracket 30, secured to one of the ribs 31 of the areo-foil, the turbine or wind wheel passing through a suitable opening 32, as shown. In this case it is desirable that a substantially boxlike structure 33 be formed around the generator in order that moisture or foreign matter entering the opening 32 may not be able to obtain access to the interior of the aero-foil and thus damage the bracing wires or other internal parts of the structure. I wish to have it understood that while the driving mechanism of my invention finds particular utility when employed to operate a generator, as herein described, its use is by no means so limited.

Having thus described my invention, what I claim is:

1. In combination with an airplane comprising a closed fuselage, a driven device supported in and inclosed by the fuselage, an opening in the fuselage adjacent said driven device, and means for operating said driven device comprising a turbine wheel having its axis of rotation inside the fuselage, said turbine wheel passing through said fuselage opening so that a portion only of its periphery is exposed to the passing air when the airplane is in flight.

2. In combination with an aircraft, a driven device, comprising a shaft, disposed within an inclosed portion of the aircraft structure, and a wind wheel fixed upon said shaft and having a portion of its periphery exposed to the passing air when the aircraft is in flight.

3. In combination with an airplane comprising a closed fuselage, an electric generator supported in and inclosed by the fuselage, an opening in the fuselage adjacent said generator, and a turbine wheel fixed upon the armature shaft of said generator, said turbine wheel passing through said fuselage opening so that a portion of its periphery is exposed to the passing air, the major portion of said turbine wheel and its entire axis being within the fuselage and not exposed to the passing air.

4. In combination with an airplane, an electric generator supported in and inclosed by a stream-lined portion of the airplane structure, a wind wheel fixed upon the armature shaft of said generator and having a portion of its periphery exposed to the passing air, the major portion of the wind wheel and its entire axis being inclosed by said stream-lined portion of the airplane structure.

5. Electric current generating means for aircraft comprising an electric generator disposed within and protected by an inclosed portion of the aircraft structure, a wind wheel fixed upon the armature shaft of said generator and having a portion of its periphery exposed to the passing air when the aircraft is in flight, the entire axis of said wheel being inclosed within said portion.

6. Electric current generating means for aircraft, comprising an electric generator supported entirely within an inclosed and stream-lined portion of the aircraft structure, an opening in the inclosing structure adjacent said generator, and a turbine wind wheel extending through said opening, said turbine wind wheel being fixed upon the armature shaft and having a portion of its periphery exposed to the passing air and its entire axis inclosed within said portion, whereby the generator is operated when the aircraft is in flight.

7. In combination with an airplane of the closed fuselage tractor propeller type, an electric current generator supported in and entirely inclosed by the fuselage, an opening in the fuselage adjacent said generator, and a wind wheel fixed upon the armature shaft of said generator, said wind wheel passing through said fuselage opening, so that a portion of its periphery is exposed to the slip stream of the tractor propeller and its entire axis inclosed within said fuselage, whereby the said wind wheel is rotated to drive the generator.

8. In an aircraft an auxiliary power unit comprising a paddle wheel in combination with a wind fairing surface of a fuselage, said wind fairing surface of the fuselage having an opening adapted to permit a portion of the blades of said paddle wheel to project therethrough into a current of air parallel with said surface, the remainder of said paddle wheel together with its supports and subsidiary mechanism being entirely contained within said fuselage.

In witness whereof, I hereunto subscribe my name this 28th day of April, 1919.

EDWARD F. ANDREWS.

Witnesses:
 EDNA V. GUSTAFSON,
 A. G. MCCALEB.